(12) United States Patent
Ashworth et al.

(10) Patent No.: US 7,539,666 B2
(45) Date of Patent: May 26, 2009

(54) METHOD, SYSTEM AND PROGRAM FOR MANAGING GEOGRAPHIC DATA STORED IN A DATABASE

(75) Inventors: Mark A. Ashworth, Bowmanville (CA); Joe Mariconda, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/819,458

(22) Filed: Apr. 6, 2004

(65) Prior Publication Data

US 2005/0223044 A1 Oct. 6, 2005

(51) Int. Cl.
*G06F 7/00* (2006.01)
*G06F 17/30* (2006.01)

(52) U.S. Cl. .............................. 707/3; 707/2; 701/208
(58) Field of Classification Search ............... 707/1–10, 707/102, 104, 200, 100; 701/208
See application file for complete search history.

(56) References Cited

U.S. PATENT DOCUMENTS

| | | | | |
|---|---|---|---|---|
| 5,261,088 | A | 11/1993 | Baird et al. | 707/206 |
| 6,308,177 | B1 * | 10/2001 | Israni et al. | 707/100 |
| 6,336,111 | B1 * | 1/2002 | Ashby et al. | 707/4 |
| 6,502,094 | B1 * | 12/2002 | Gvily et al. | 707/5 |
| 6,519,597 | B1 | 2/2003 | Cheng et al. | 707/10 |
| 6,636,849 | B1 | 10/2003 | Tang et al. | 707/6 |
| 6,732,120 | B1 * | 5/2004 | Du | 707/104.1 |
| 7,107,285 | B2 * | 9/2006 | von Kaenel et al. | 707/104.1 |
| 7,177,882 | B2 * | 2/2007 | Xie et al. | 707/104.1 |
| 7,266,560 | B2 * | 9/2007 | Lampert et al. | 707/101 |
| 2001/0042240 | A1 | 11/2001 | Ng et al. | 717/122 |
| 2003/0212689 | A1 * | 11/2003 | Chen et al. | 707/100 |

OTHER PUBLICATIONS

Burge et al. *Qualitative Spatial Relations Using Arrangements for Complex Images*, Proc. Of the SPIE—The Intl. Society for Optical Engineering, vol. 2826, pp. 152-158, 1996.
Berchtold, et al., *Indexing the Solution Space: a New Technique for Nearest Neighbor Search in High-Dimensional Space*, IEEE Transactions on Knowledge and Data Engineering, vol. 12, No. 1, pp. 45-57, 2000.

(Continued)

*Primary Examiner*—Hosain T Alam
*Assistant Examiner*—Shew-Fen Lin
(74) *Attorney, Agent, or Firm*—David Victor; Konrad Raynes & Victor LLP

(57) ABSTRACT

A method, a data processing system and an article of manufacture for managing geographic identifiers stored in a database is described herein. The geographic identifiers each identify a respective geographic feature displayed on a surface map space partitioned by a mosaic of non-rectilinear shaped cells. The data processing system includes an accessing module for accessing a geographic look-up table and an index for the geographic look-up table, the geographic look-up table and the index being stored in the database, an identification module for identifying, from the index, stored row identifiers associated with a subset of the mosaic of non-rectilinear shaped cells, and a retrieving module for retrieving, from the geographic look-up table, stored geographic identifiers associated with the identified stored row identifiers.

27 Claims, 8 Drawing Sheets

OTHER PUBLICATIONS

Bohm, et al., *Searching in High-Dimensional Spaces-Index Structures for Improving the Performance of Multimedia Databases*, ACM Computing Surveys, vol. 33, No. 3, Sep. 2001, pp. 322-373.

Guting, R. H.; *An Introduction to Spatial Database Systems*, BLDB Journal, 3, 357-399 (1994) Invited contribution Hans-J. Schek, Editor.

Hirano, Y. et al; *Quantification of the Spatial Distribution of Line Segments with Applications to CAD of Chest X-Ray CT Images*, Geometry, Morphology and Computational Imaging vol. 2616, pp. 22-38, 2003.

Boots et al., *Investigating Recursive Point Voronoi Diagrams*, Geographic Information Science: 2nd Intl. Conference, vol. 2478, pp. 1-21, Sep. 25-28, 2002.

Li, et al, *Multi-agent Systems for Web-based Map Information Retrieval*, Geographic Information Science 2nd Intl. Conference, vol. 2478/2002, pp. 161-180, Sep. 25-28, 2002.

* cited by examiner

OPERATION S500 OF
INFORMATION RETRIEVAL SYSTEM 418
OF FIG. 4

OPERATION S600 OF TABLE MODULE 418B OF FIG. 4

METHOD, SYSTEM AND PROGRAM FOR MANAGING GEOGRAPHIC DATA STORED IN A DATABASE

FIELD OF THE INVENTION

The present invention relates to information retrieval systems, and more particularly the present invention relates to a method, system and computer program product for managing geographic data stored in a database.

BACKGROUND

Geographic data relates to data concerning the topography of a specific geographic region, and this data may include geodetic data and non-geodetic data. Geodetic data refers to geographic data that is stored in an angular coordinate system (such as, for example, latitude and longitude information) that is geo-referenced to the earth's surface. Non-geodetic data includes geographic data that has been projected to a "flat" map.

It is generally known to overlay rectilinear shaped cells, typically in the form of a straight-lined grid pattern, overtop of a surface map displaying geographic features, and then to store geographic data related to the geographic features along with associated cell IDs in a database. The each cell ID is a unique cell identifier for a particular rectilinear shaped cell.

Information retrieval systems are then used to retrieve specific stored geographic data in response to query requirements issued by a user. Typically the sort of surface maps having overlaid rectilinear-shaped grids have the north pole represented as a straight line along the top peripheral border of the surface map and the south pole represented as another straight line along the bottom peripheral border of the surface map, while the 180th Meridian (formerly the International Date Line matched up with the 180th Meridian but no longer) is used as the peripheral border of the sides of the surface map.

A rectilinear shaped cell is bounded by, or characterized by, a straight line or lines formed into a box-like shape which may include a square shaped cell (that is, a plane figure having four equal sides), or a shape having an equal-sided rectangular form, or some shape having one or more right angles, or a figure having four right angles (a rectangular figure twice as long as it is wide which may have a set of mutually perpendicular axes that meet at right angles).

To access a large volume of geographic data, an index is used. Ideally, the index should permit the information retrieval system to access stored geographic data quickly and efficiently. For a given query, the index should be used in a seamless manner, even for cases when the query includes a region of interest (that is, a given subset of the mosaic of rectilinear shaped cells) that spans across the polar regions of the globe (that is, across the peripheral edges or borders of the surface map). The region of interest may span across the International Date Line (that is, the side borders of the surface map). At present, the information retrieval system may examine parts of the database that are related to the rectilinear shaped cells which are not of interest because these cells happen to be placed between the polar regions. Therefore time would be wasted on these sorts of queries that attempt to search across peripheral borders.

Accordingly, a solution is desired that addresses, at least in part, these shortcomings.

SUMMARY

The present invention obviates or mitigates at least some of the above mentioned disadvantages.

In an aspect of the present invention, there is provided a data processing system for managing geographic identifiers stored in a database, the geographic identifiers each identifying a respective geographic feature displayed on a surface map space partitioned by a mosaic of non-rectilinear shaped cells, the data processing system including an accessing module for accessing a geographic look-up table and an index for the geographic look-up table, the geographic look-up table and the index being stored in the database, an identification module for identifying, from the index, stored row identifiers associated with a subset of the mosaic of non-rectilinear shaped cells, and a retrieving module for retrieving, from the geographic look-up table, stored geographic identifiers associated with the identified stored row identifiers.

In another aspect of the present invention, there is provided a method of directing a data processing system to manage geographic identifiers stored in a database, the geographic identifiers each identifying a respective geographic feature displayed on a surface map space partitioned by a mosaic of non-rectilinear shaped cells, the method including accessing a geographic look-up table and an index for the geographic look-up table, the geographic look-up table and the index being stored in the database, identifying, from the index, stored row identifiers associated with a subset of the mosaic of non-rectilinear shaped cells, and retrieving, from the geographic look-up table, stored geographic identifiers associated with the identified stored row identifiers.

In yet another aspect of the present invention, there is provided an article of manufacture having a program usable medium embodying one-or more computer usable instructions executable by a data processing system, the computer usable instructions for directing the data processing system to manage geographic identifiers stored in a database, the geographic identifiers each identifying a respective geographic feature displayed on a surface map space partitioned by a mosaic of non-rectilinear shaped cells, the article of manufacture including instructions for accessing a geographic look-up table and an index for the geographic look-up table, the geographic look-up table and the index being stored in the database, instructions for identifying, from the index, stored row identifiers associated with a subset of the mosaic of non-rectilinear shaped cells, and instructions for retrieving, from the geographic look-up table, stored geographic identifiers associated with the identified stored row identifiers.

BRIEF DESCRIPTION OF THE DRAWINGS

A better understanding of these and other embodiments of the present invention can be obtained with reference to the following drawings and detailed description of the preferred embodiments, in which.

Similar references are used in different figures to denote similar components.

DETAILED DESCRIPTION OF THE EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
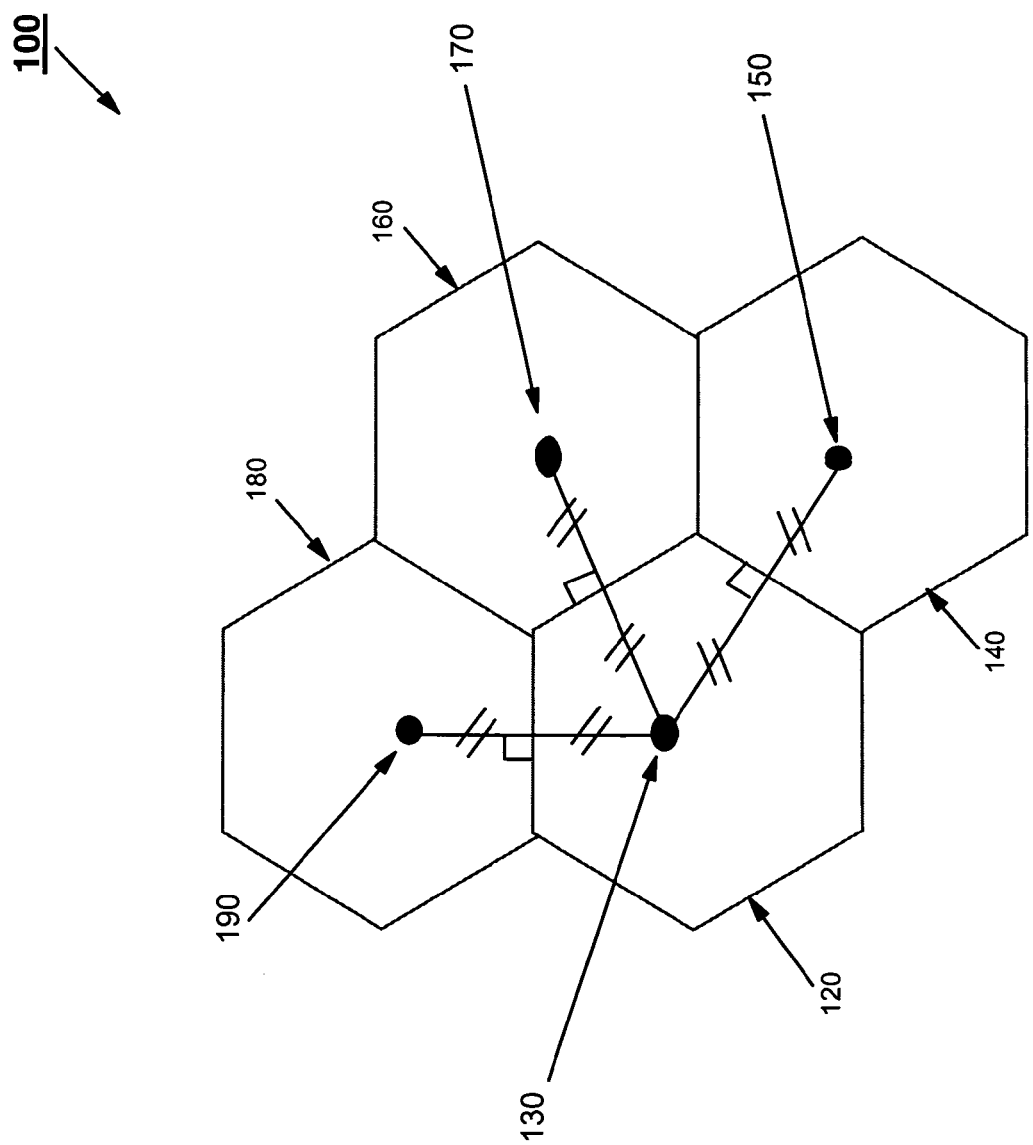
FIG. 1 shows a mosaic of non-rectilinear shaped cells formed into a mosaic of Voronoi cells.

FIG. 1 shows a mosaic 100 of non-rectilinear shaped cells 120, 140, 160 and 180 (hereinafter 'cells'). The mosaic 100, in this example, is formed into a mosaic of Voronoi cells. A Voronoi tessellation is a mosaic of Voronoi shaped cells that cover the earth's surface wherein each Voronoi cell is shaped into a convex hull (the panels used in a soccer ball are Voronoi shaped cells). Centers 130, 150, 170 and 190 of each respective cell 120, 140, 160 and 180 may be placed in a manner that a line may be drawn between a pair of neighboring cells (such as neighboring cell pairs 120 and 180, 120 and 160, or 120 and 140). The edge of a cell bisects the line drawn between each neighboring pair of cells, and also strikes the line orthogonally as shown in FIG. 1. Another example of a non-rectilinear shaped cell is a triangular shaped cell incorporated in the Buckminster Fuller geodesic dome (not illustrated). The non-rectilinear shaped cells approximate the shape of a curved surface to an acceptable level of tolerance which is controllable by selecting an appropriately sized cell. It may be possible to use both the Voronoi cells along with the triangular shaped cells in conjunction. It will be appreciated that other regular shaped or irregular shaped cells may be used. However, for the purposes of illustrating the embodiments, the Voronoi cells are used.

Figure 2:
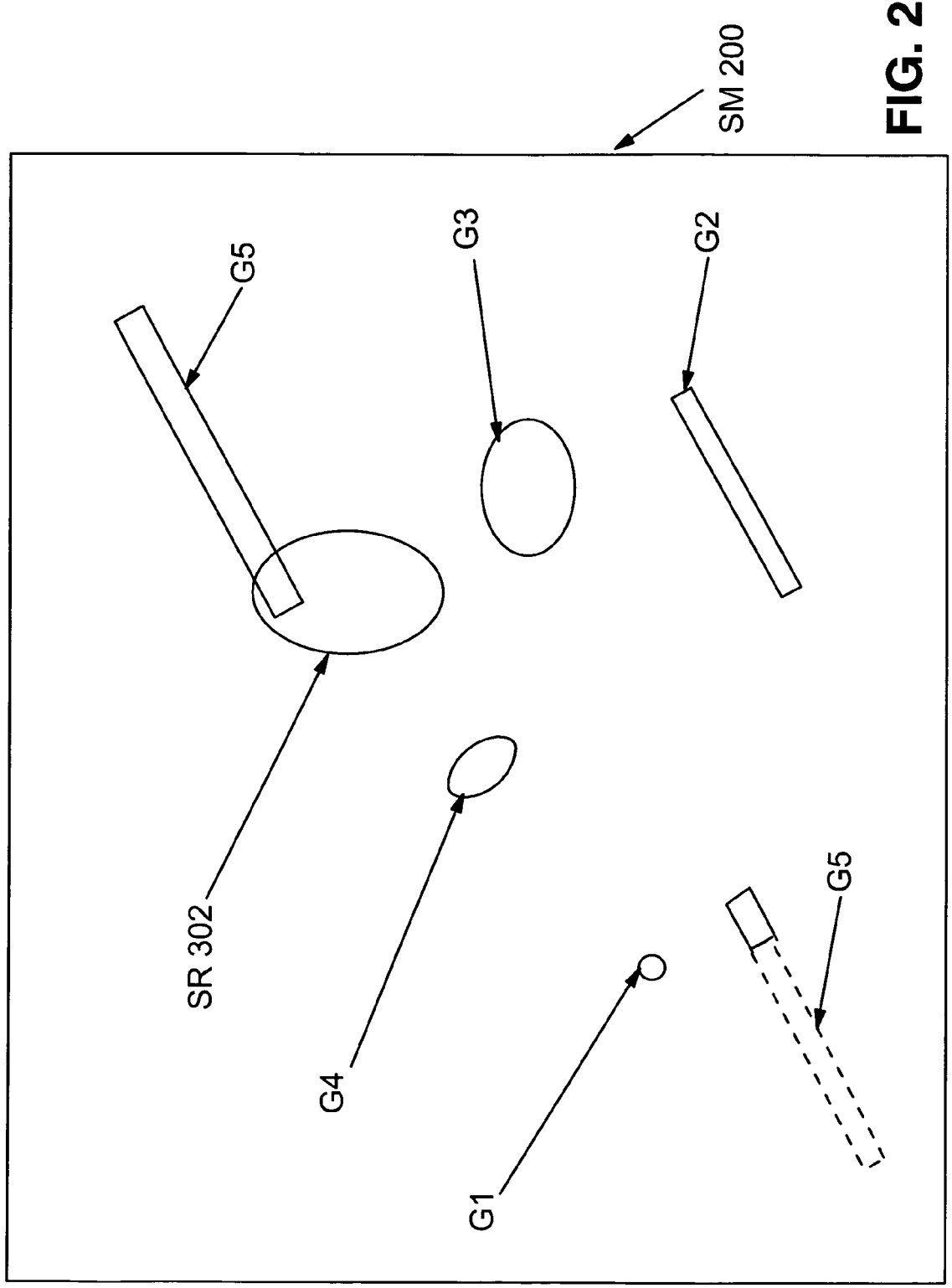
FIG. 2 shows a surface map before the surface map is overlaid with the mosaic of non-rectilinear shaped cells of FIG. 1.

FIG. 2 shows a surface map SM 200 before it is overlaid with the mosaic of non-rectilinear shaped cells 100 of FIG. 1. The surface map SM 200 may be a flat surface or it may be a spherical globe or orb, a portion of a spherical orb, or—more generally—a curved surface all used to represent the earth or a portion of the earth; these curved surfaces are preferred surfaces in comparison to the flat, two-dimensional surface. The surface map SM 200 may also be a flat, two-dimensional surface map such as a foldable automobile map.

The surface map SM 200 includes geographic features G1, G2, G3, G4 and G5. For example, feature G1 may represent a small town; feature G2 may represent a stream or river; feature G3 may represent a lake; feature G4 may represent a city; feature G5 may represent a road or street. The surface map SM 200, to illustrate the embodiment, may represent a portion of a curved surface which wraps around itself in a manner such that feature G5 meets up with itself when the end portions of the surface map SM 200 are brought together, and therefore a dashed line is used to represent the portions of feature G5 which overlap each other when the surface map SM 200 is wrapped around itself.

Figure 3:
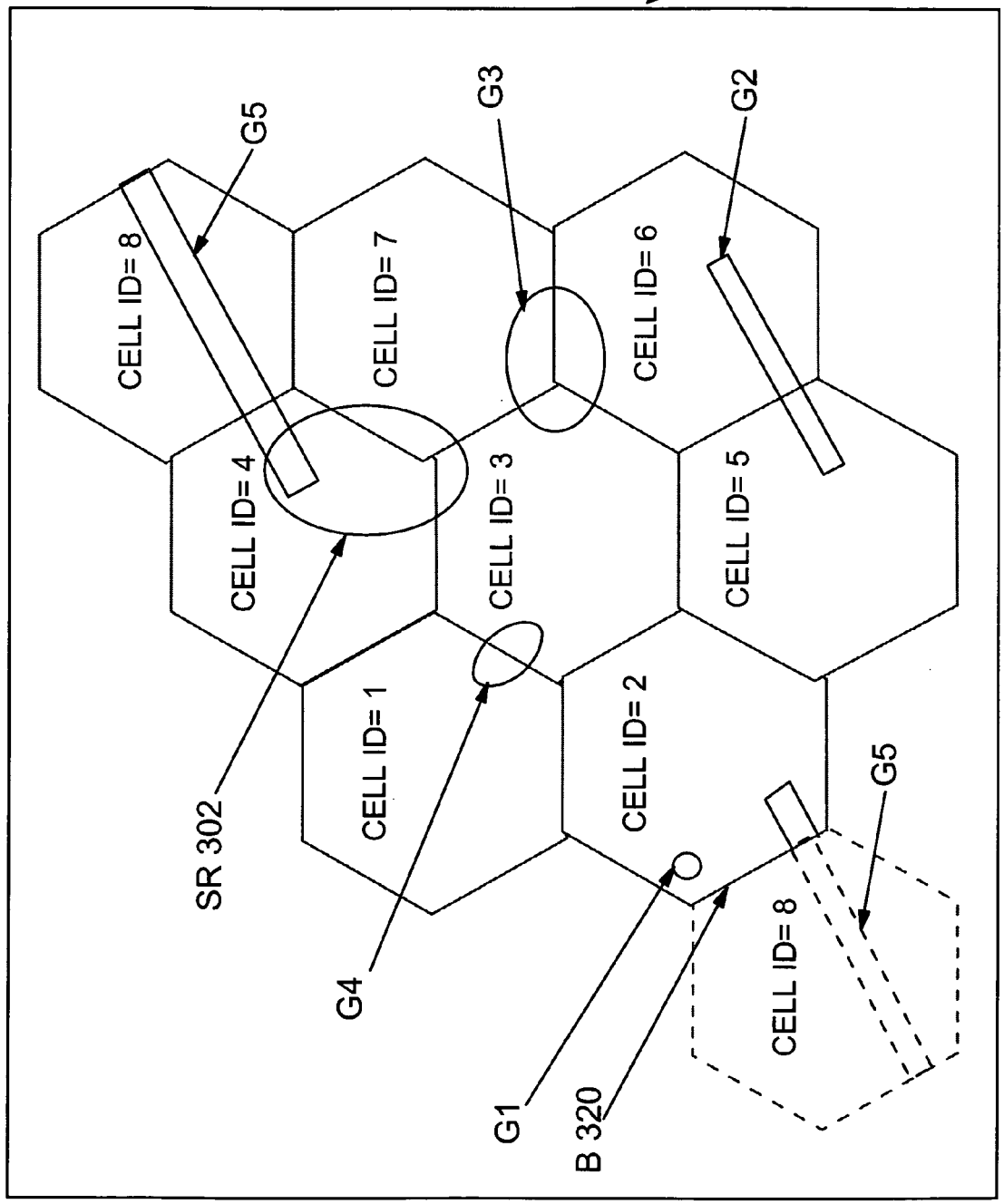
FIG. 3 shows the mosaic of non-rectilinear shaped cells of FIG. 1 overlaying the surface map of FIG. 2.

FIG. 3 shows the mosaic 100 of non-rectilinear shaped cells of FIG. 1 overlaying the surface map SM 200 of FIG. 2. Each cell is assigned a cell_ID (that is, a unique cell identifier for a particular cell). As a result of overlaying the mosaic of cells 100 onto the surface map SM 200, feature G1 is located in a cell marked by cell identifier 2 (that is, cell_ID=2); feature G2 is located in cells marked by cell identifiers 5 and 6 (that is, cell_ID=5, cell_ID=6); feature G3 is located in cells marked by cell identifiers 3, 6 and 7 (that is, cell_ID=3, cell_ID=6, cell_ID=7); feature G4 is located in cells marked by cell identifiers 1 and 3 (that is, cell_ID=1 and cell_ID=3); feature G5 is located in cells identified by cell identifiers 2, 4 and 8 (that is, cell_ID=2, 4 and 8). In this example, the surface map SM 200 is intended to be wrapped around itself such that the cells marked by cell identifiers 2 and 8 will share a common peripheral border B320.

The surface map SM 200 is a surface that may be partitioned by the mosaic 100. The surface map SM 200 may include such surfaces as a planar surface, an ellipsoidal surface or a spherical surface. Each Voronoi cell shown in FIG. 2 is identified by a unique cell_ID (that is, each cell is identifiable by a unique cell identifier).

A mosaic of non-rectilinear shaped cells overlays a spherical globe more closely than overlaying the spherical globe with a mosaic of rectilinear shaped cells (such as a square grid pattern of cells).

Also shown in FIG. 3 is search area SR302 which will be a selected area or a selected subset of the mosaic 100 that will be searched for geographic data. The search area SR 302 indicates that a subset of the mosaic of cells identified by cell_IDs 4, 3 and 7 are to be searched for geographic data that is stored in a database as will be described below in further detail below.

Figure 4:
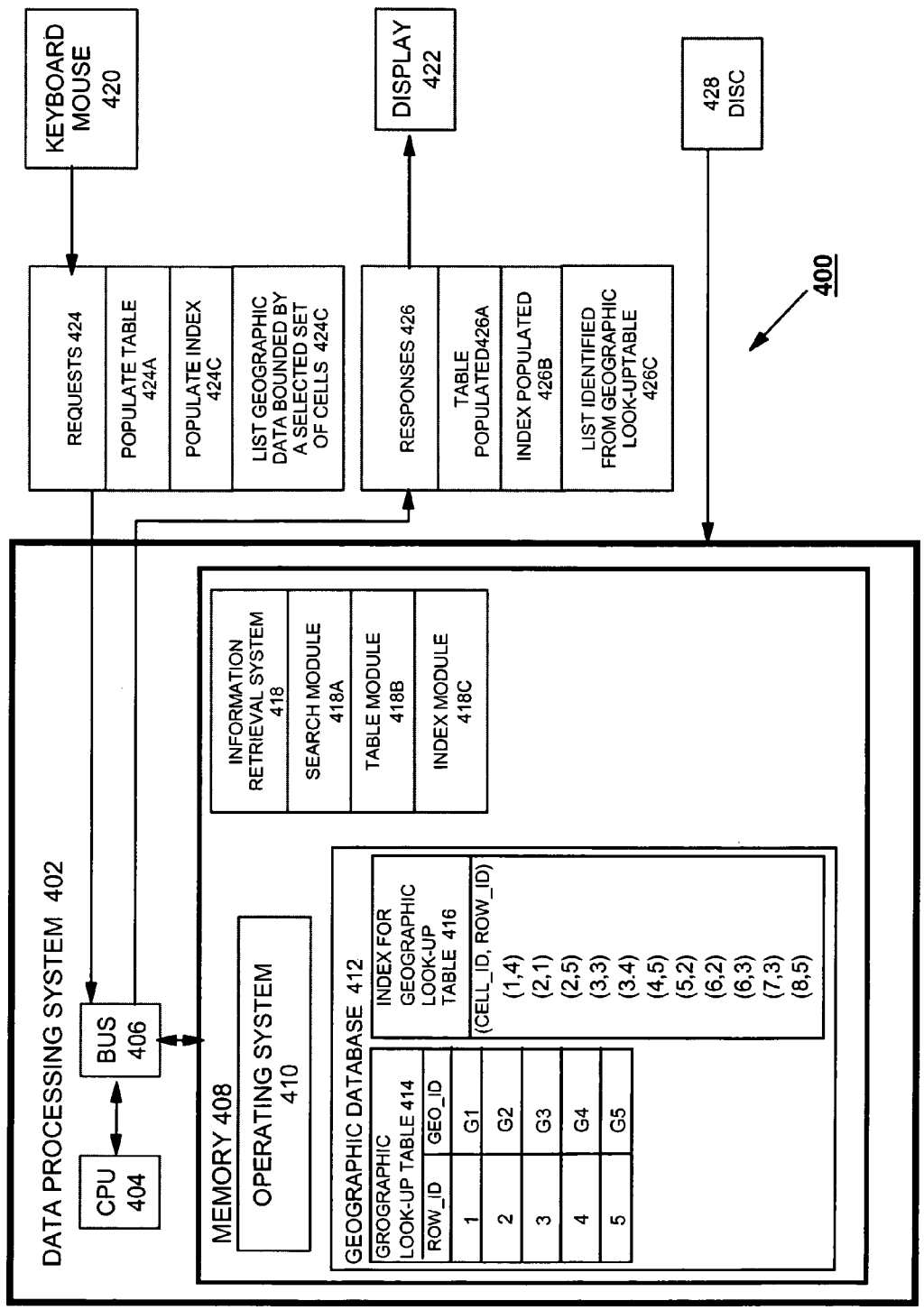
FIG. 4 shows an information retrieval system adapted to retrieve geographic data, which is stored in a database, in which the geographic data is related to the surface map of FIG. 3.

FIG. 4 shows an information retrieval system (IRS) 418 adapted to retrieve geographic data stored in a database 412, in which the geographic data is displayed or contained in the surface map SM200 of FIG. 3. IRS 418 can also be called a data management system or a relational database management system.

A data processing system (DPS) 402 includes a central processing unit (CPU) 404, memory 408, and a bus 406 which operatively interconnects the CPU 404 and the memory 408. Also operatively connected to the bus 406 of the DPS 402 are user peripheral devices 420 (keyboard) and display 422 for handling user input/ouput (I/O) as known to those skilled in the art. For the purpose of explaining the embodiment, a single data processing system will be described. However, it will be appreciated that the IRS 418 may be adapted to operate with a plurality of DPSs (not illustrated) and that portions of the IRS 418 may be relocated into the memories of the plurality of DPSs. Memory 408 may include a combination of RAM, ROM, hard disk, etc.

Stored in memory 408 is the database 412 containing geographic data in a geographic look-up table 414 and containing an index 412 of the table 414. Since it is expected that database 412 will contain large amounts of data, database 412 will be placed in hard disk (or similar type of memory). The memory 408 also contains an operating system (OS) 410 which are known to those skilled in the art. OS 410 handles general purpose tasks as known in the art, such as transferring data over the bus 402. Also stored in memory 408 is the IRS 418. The IRS 418 includes computer-executable programmed code, organized into convenient code modules 418A, 418B and 418C, which are used to instruct or direct the CPU 404 to respond to specific user requests 424, sent by a user via user interface devices 420 (keyboard and/or mouse), and received by the CPU 404 over the bus 406. The computer-executable programmed code may be compiled from computer programmed instructions written in a high-level computer programming language using compilers known to those skilled in the art. The IRS 418 also provides responses 426 (via bus 406 to display 422) to requests 424. The requests 424 include several types of requests (such as requests 424A, 424B and 424C), and the responses 426 include several types of responses (such as responses 426A, 426B and 426C). The following description will describe the manner in which these responses 426 and requests 424 are used by the IRS 418. Code modules may have names such as an accessing module, an identifying module, and a retrieving module for example.

Disc 428 is a computer program product including a computer readable medium tangibly embodying computer executable code for implementing the IRS 418 by moving the executable code stored in the disc 428 through a disc drive device (not illustrated) and continuing via the bus 406 and into storage in memory 408 and later executed by the CPU 404. It will be appreciated that an equivalent to the disc 428 is usage of a network operatively attached, in the manner known to those skilled in the art, to the data DPS 402, and then the executable code of disc 428 may be downloaded to the memory 408 via the network (not illustrated).

The database 412 includes the geographic look-up table 414 and the index 416 of the geographic look-up table 414.

The table 414 includes two columns in which the first column contains row_IDs (each row_ID is a unique identifier identifying a respective row of the table 414), and the second column contains geographic_ID (each unique identifier of a geographic feature, such as G1, G2, G3, G4 and G5, is found on the surface map SM 200 of FIG. 3). The geographic look-up table 414 contains an ordered listing of geographic data contained in the surface map SM200 of FIG. 3. The rows contained in the table 414 pair up a specific geographic identifier with a unique row_ID. The manner in which the table 414 is populated with geographic data will be described below (see description for FIG. 6 below).

An identifier is any entity that is used to identify another entity. The identifier is a label of sorts. The identifier is not limited to a number per se. They may be numbers, letters, words, symbols, markings, squiggles, etc: any abstract symbol. A geographic entity exists on earth, and the geographic entity does not exist—literally—on a map (it's the geographic identifier that exists on the map). A map includes some sort of symbols, or more generically, identifiers which indicate the presence of a geographic entity. The identifier is an abstract representation of the real entity.

The index 416 may assume any form. It will be appreciated that the index 416 may be, for example, a B-tree index, a hash index or a common delineated index, and it expected that persons skilled in the art would know how to adapt specific indexes to implement index 416. The index 416 contains a set of tuples (cell_ID, row_ID). The first part of each tuple includes data for a cell_ID (that is, an identifier which identifies a specific cell overlaid onto the surface map SM 200 of FIG. 3). The second part of each tuple includes data for a row_ID (that is, an identifier for a specific row of table 414). The manner in which the index 416 is populated with indexing data (here illustrated as a listing of tuples) will be described below (see description for FIG. 7 below).

The manner in which the table 414 and the index 416 are used to obtain geographic data for a selected subset of the mosaic 100 (such as search area SR302) will be described below (see description for FIG. 8 below).

IRS 418 includes computer-executable programmed code organized into convenient code modules 418A, 418B and 418C, in which each code module is used to perform one or more specific tasks for functions.

Code module 418B provides executable code for directing the CPU 404 to populate the table 414 based on a request 424A to populate the table 414 which is to be received (by the CPU 404) from the user (via bus 406). Once the table 414 has been populated, module 418B directs the CPU 404 to assemble a response 426A (indicating that the table 414 has been populated) which will be outputted to the display device 422. The instructions provided by the code module 418B for directing the CPU 404 (also called operations of module 418B) will be described below (see description for FIG. 6).

Code module 418C provides executable code for directing the CPU 404 to populate the index 416 based on a request 424B to populate the index 416 which is to be received (by the CPU 404) from the user (via bus 406). Once the index 416 is populated, module 418C directs the CPU 404 to assemble a response 426B (indicating that the index 416 has been populated) which will be outputted to the display device 422. The instructions provided by the code module 418C for directing the CPU 404 (also called operations of module 418C) will be described below (see description for FIG. 7).

Code module 418A provides executable code for directing the CPU 404 to search and retrieve data stored in the geographic database 412 based on a request 424C (which is also called a query) received from a user. Once the code module 418A has retrieved the desired geographic data from the table 414, module 418A directs the CPU 404 to assemble a response 426C which will be outputted to the display device 422. The instructions provided by the code module 418A for directing the CPU 404 (also called operations of module 418A) will be described below (see description for FIG. 8 below).

The embodiment may be integrated easily in to existing database management systems at a low implementation cost. With the index 416, a global spatial database management system may be implemented on top of an existing database management system.

Figure 5:
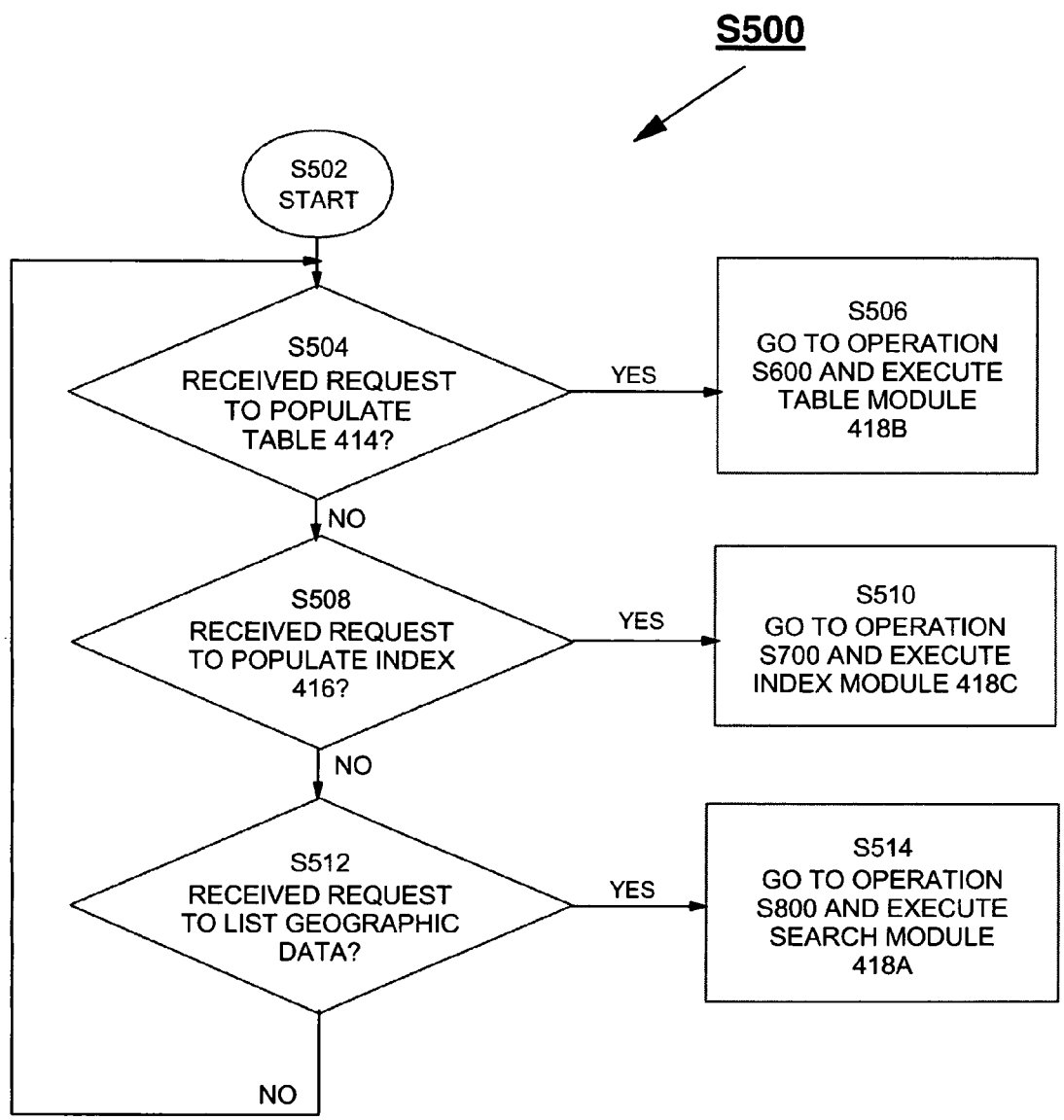
FIG. 5 shows operations of the information retrieval system of FIG. 4 for handling three types of user commands.

FIG. 5 shows operations S500 for handling three types of user requests 424A, 424B and 424C submitted to the IRS 418 of FIG. 4.

Operation S502 includes code for initializing the IRS 418 (with assistance from the operating system 410), and the IRS 418 performs peripheral or administrative tasks for managing databases, as known to those skilled in the art, which readies the IRS 418 to deal with requests 424 and provide responses 426.

Operation S504 includes executable code for directing the CPU 404 to determine whether the request 424A to populate the table 414 was received by the CPU 404 via the bus 406. If the CPU 404 did receive the request 424A, operation is then transferred to operation S506 in which case the request 424A to populate the table 414 will be handled by the code module 418B of the IRS 418 (that is operation S506 will transfer control to operation S600 of FIG. 6 which is explained further below). If the CPU 404 did not receive the request 424A, control is then transferred to operation S508.

Operation S508 includes executable code for directing the CPU 404 to determine whether the request 424B to populate the index 416 was received by the CPU 404 via the bus 406. If the CPU 404 did receive the request 424B, operation is then transferred to operation S510 in which case the request 424B to populate the index 416 will be handled by the code module 418C of the IRS 418 (that is, operation S510 will transfer control to operation S700 of FIG. 7 which will be explained further below). If the CPU 404 did not receive the request 424B, control is then transferred to operation S512.

Operation S512 includes executable code for directing the CPU 404 to determine whether the request 424C to provide a list of geographic data for a specific search area was received by the CPU 404 via the bus 406. If the CPU 404 did receive the request 424C, operation is then transferred to operation S514 in which case the request 424C will be handled by the code module 418A of the IRS 418 (that is operation S514 will transfer control to operation S800 of FIG. 8 which will be explained further below). If the CPU 404 did not receive the request 424C, control is then transferred back to operation S504 and the cycle is repeated. Alternatively, if the CPU 404 did not receive the request 424C, the operation of IRS 418 may be ended and then restarted at a later time when needed.

Figure 6:
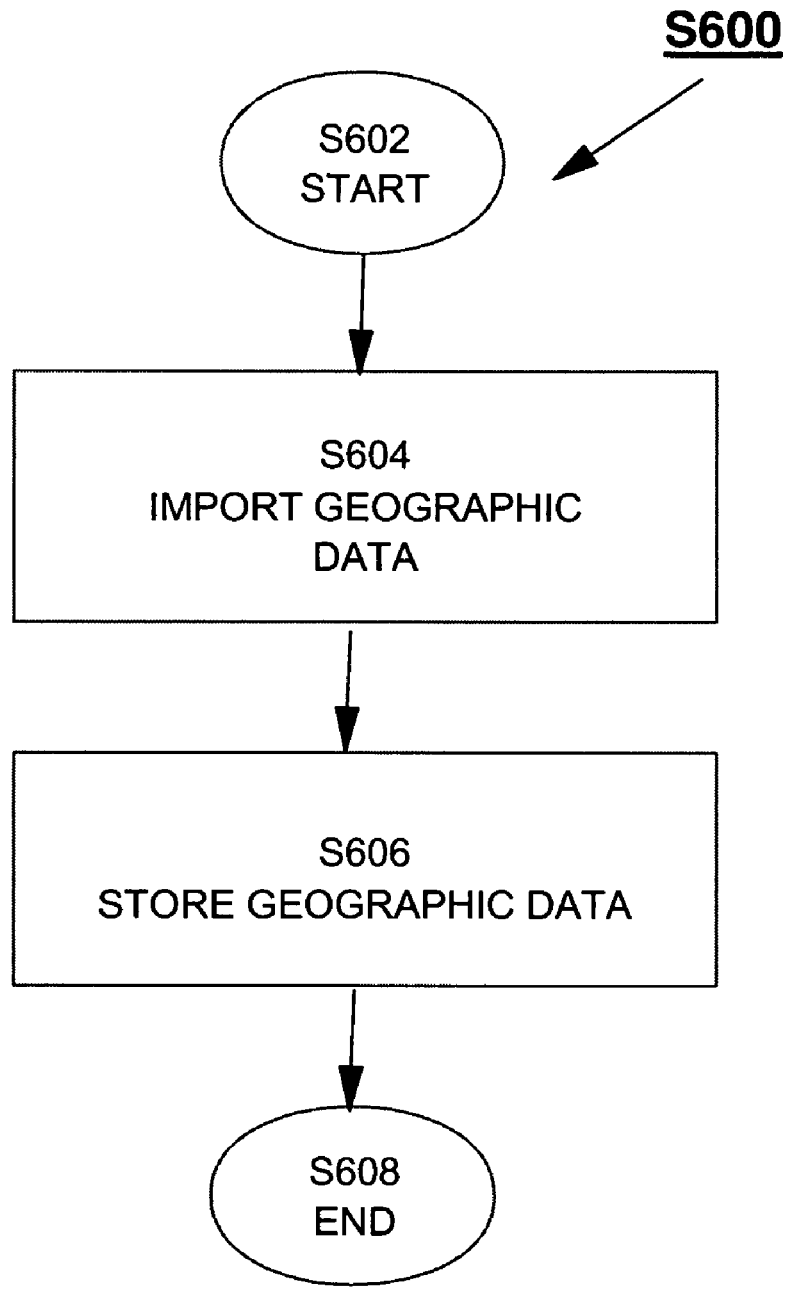
FIG. 6 shows operations of the information retrieval system of FIG. 4 for handling a first type of user command.

FIG. 6 shows operations of the IRS 418 of FIG. 4 for handling a first type of user request or command 424A. Module 418B will direct the CPU 404 to create the table 414. Operation S602 begins the table creation process once CPU 404 receives the request 424A. In effect, operation S600 may be treated as an accessing module for accessing a geographic look-up table and an index for the geographic look-up table, in which the geographic look-up table and the index are stored in the database.

Operation S604 imports the geographic data either manually or by electronic data format into the memory 408.

Operation S606 transfers the stored geographic data into the table 414.

Operation S606 ends the operations of module 418B. Once the operations of module 418B are ended, control maybe transferred to the IRS 418.

Figure 7:
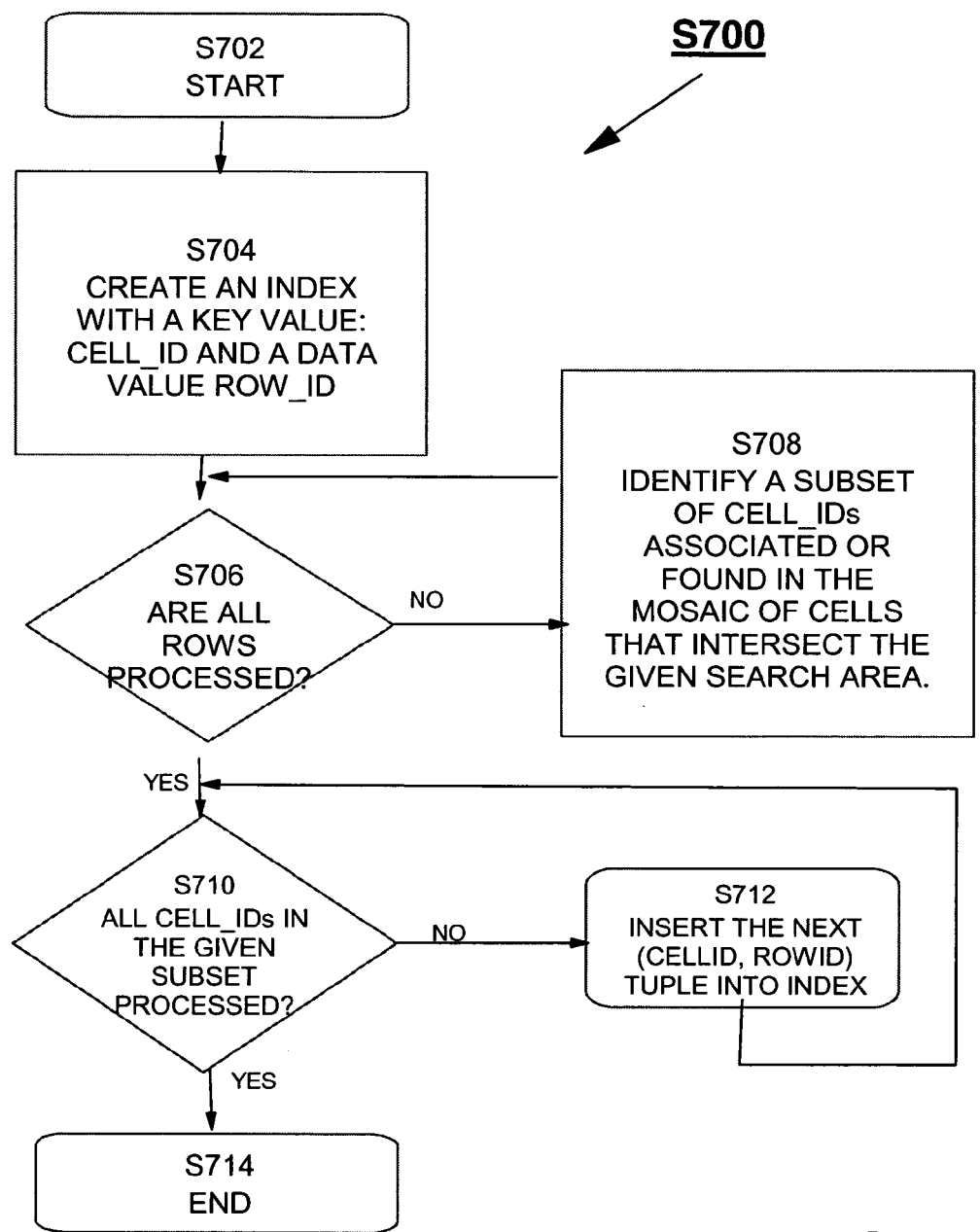
FIG. 7 shows operations of the information retrieval system of FIG. 4 for handling a second type of user command; and, FIG. 8 shows operations of the information retrieval system of FIG. 4 for handling a third type of user command.

FIG. 7 shows operations for handling a second type of user request 424B (that is, a user request to have the CPU 404 manage the index 412) submitted to the IRS 418 of FIG. 4. Module 418C will direct the CPU 404 to create the index 416. Operation S702 begins the index creation process once CPU 404 receives the request 424B. In effect, operation S700 may be treated as an identification module for identifying, from an index, stored row identifiers associated with a subset of the mosaic of non-rectilinear shaped cells.

Operation S704 directs the CPU 404 to create an index 416, such as, for example, a non-unique B-tree index (BT index or binary tree index), in which the index 416 includes a key value of cell_ID and a data value of row_ID. The row_ID uniquely identifies a specific row of the geographic look-up table 414 that contains or is associated with a specific geographic value.

Operation S706 directs the CPU to determine whether all rows of the index 416 have been processed. If all the rows have been processed, control is then transferred to operation S714 in which case the index creation process ends. If there are any rows yet to be processed, control is then transferred to operation S708.

Operation S708 directs the CPU to insert a row. For a given row having a row_ID and a geographic_ID, determine those Voronoi cells (generally speaking, non-rectilinear cells) in mosaic of cells (that is, the mosaic is a Voronoi tessellation) which intersect the geographic_ID. For example, referring to table 414 of FIG. 4, the first row of table 414 contains row_ID=1 and geographic_ID=1; then, referring back to FIG. 3, it is determined that geographic_ID=1 is located in cell_ID=2, and then an tuple is created and inserted into the index 416 in which the created tuple is (2,1) which represents (cell_ID=2, geographic_ID=1). This process is repeated for the remaining row_IDs of table 414.

For example, referring back to table 414 of FIG. 4, the second row of table 414 includes row_ID=2 and geographic_ID=2; then, referring back again to FIG. 3, it is determined that geographic_ID=2 is located in cell_ID=5 and cell_ID=6, and then two tuples are created and inserted into the index 416 in which the created tuples are (5,2) and (6,2) which represent (cell_ID=2, geographic_ID=1) and (cell_ID=2, geographic_ID=1) respectively.

To produce an optimal index, the shape of a geographic identifier may be used in this determination. Another approach, which may be computationally faster, uses a bounding circle or bound box of a geographic identifier, instead of the actual shape, in this determination. Operation S708 processes a set of Voronoi cell_IDs.

Operation S710 inserts, for each cell_ID, a tuple (cell_ID, row_ID) into the index 416.

Once all cell_IDs have been processed, control is then transferred to operation S714.

Figure 8:
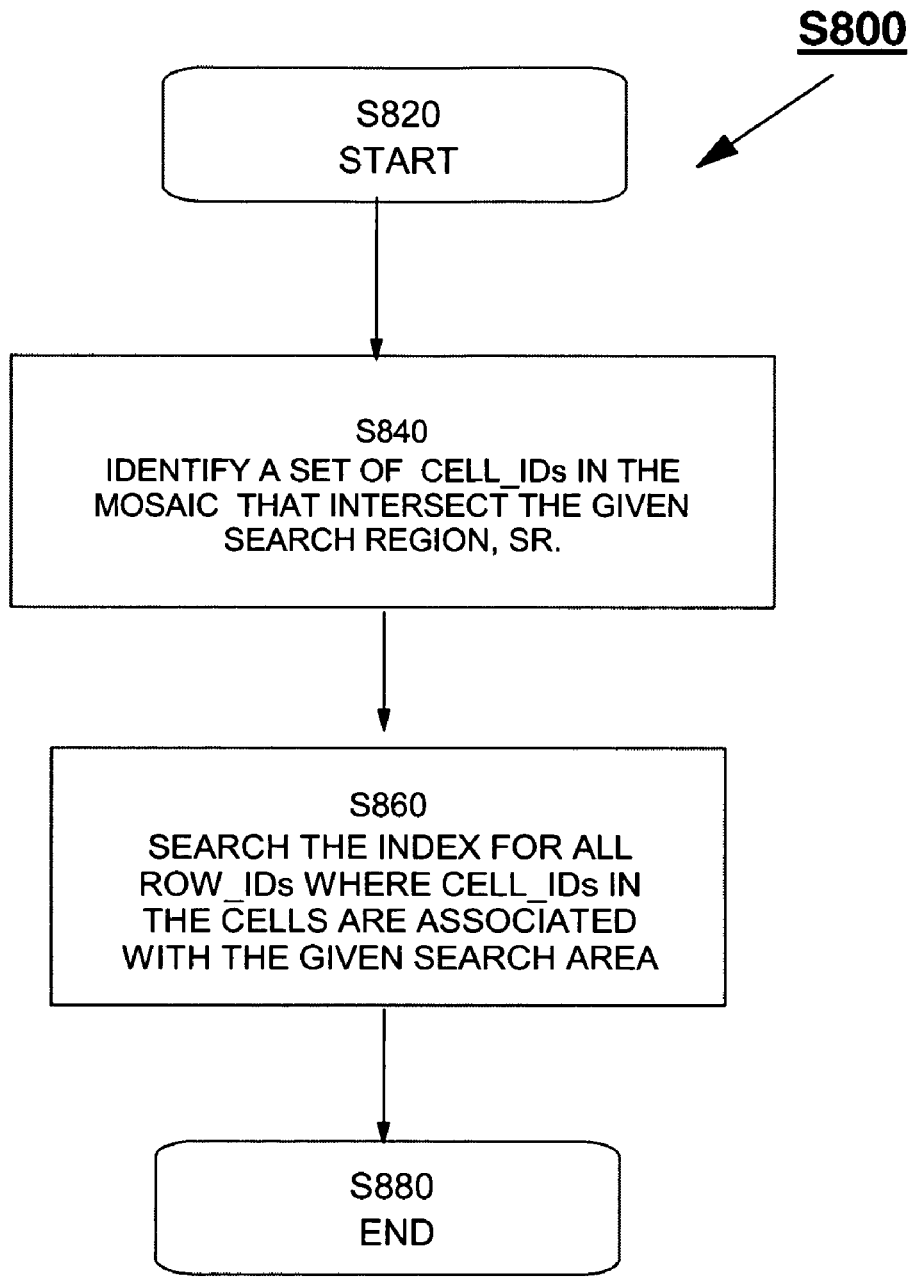

FIG. 8 shows operations for handling a third type of user request (that is, user command) 424C submitted to the IRS 418 of FIG. 4. Request 424C requests the IRS 418 to search the index 416. Upon the CPU receiving the request 424, CPU 404 executes the code of module 418A. In effect, operation S800 may be treated as a retrieving module for retrieving, from a geographic look-up table, stored geographic identifiers associated with identified stored row identifiers.

Operation S820 includes directing the CPU 404, for a given search region SR 302 of FIG. 3, to identify those cells which intersect the given search region SR 302. To produce an optimal index, the shape of the search region SR 302 may be used in this determination. A less-optimal, but a computationally faster approach, may be to use a bounding circle or bound box of the search region, instead of the actual shape of the search region SR 302, in this determination. This operation provides a listing of cell_IDs that are located within the search region. In this example, given the search region SR 302, a set of cells of interest will be cells having cell_ID=3, 6 and 7.

Operation S840 includes directing the CPU 404 to search the index for all row_IDs which are tupled with cell_IDs that match the listing of cells of interest, and then produce a unique set of rowIDs. There are a few approaches to this operation.

A first approach is as follows: search the index 416 with each cell_ID in the search area SR 302. Then search the index 416 with a query predicate cell_ID=(the cell identifiers listed out). Given the search area SR 302={cell_id1, cell_id2, . . . cell_idn}, the search condition is: cell_ID=cell_id1 OR cell_ID=cell_id2 OR . . . OR cell_ID =cell_idn.

A second approach is as follows: search the index 416 with query range predicates. Determine a set of continuous ranges, rs, of cell_IDs in a given search area. Given that the search area={cell_id1, cell_id2, . . . cell_idn }, produce a set of range predicates, rs={(min_cell_id1, max_cell_id1), (min_cell_id2, max_cell_id2), . . . , (min_cell_id_m, max_cell_id_m). The search condition is as follows: cell_id BETWEEN min_cell_id1 AND max_cell_id1 OR cell_id BETWEEN min_cell_id2 AND max_cell_id2 OR . . . OR cell_id BETWEEN min_cell_id_m AND max_cell_id_m.

Operation S880 ends the search for geographic data contained in the table 414 in which case control is transferred back to the IRS 418.

It will be appreciated that other operations of IRS 418 may be included, such as updating and/or deleting data in the table 414.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A method of directing a data processing system to manage geographic identifiers stored in a database, the geographic identifiers each identifying a respective geographic feature displayed on a surface map space partitioned by a mosaic of non-rectilinear shaped cells, the method comprising:

accessing a geographic look-up table associating a unique row identifier with each geographical feature;

for each row in the geographic look-up table, performing:

determining at least one non-rectilinear shaped cell that intersects the geographical feature associated with the row identifier in the row by determining at least one non-rectilinear shaped cell that intersects a bound box of the geographical feature;

for each of the determined at least one non-rectilinear shaped cell, generating an entry in an index identifying the row identifier of the geographical feature and the determined non-rectilinear shaped cell intersecting the geographical feature, wherein the index is a non-unique B-tree index, wherein the index associates the row identifiers of the geographical features with cell identifiers of non-rectilinear shaped cells that intersect the bound box including the geographical feature, and wherein an index key of the index comprises the identifier of the non-rectilinear shaped cell and a data value of the index comprises the row identifier of the geographical feature; and wherein the index associates the row identifiers of the geographical features with cell identifiers of non-rectilinear shaped cells that include the geographical feature, wherein there are multiple entries in the index for one row identifier intersecting multiple non-rectilinear shaped cells, wherein the multiple entries indicate the non-rectilinear shaped cells intersecting the geographical feature identified by the row identifier, and wherein the geographic look-up table and the index are stored in the database;

receiving a search region;

determining the non-rectilinear shaped cells that intersect the search region;

searching, by the data processing system, the index to determine the row identifiers associated with the cell identifiers of the determined non-rectilinear shaped cells included in the search region; and producing the determined row identifiers identifying the geographical features included in the search region.

2. The method of claim 1 further comprising:
populating the geographic look-up table; and
populating the index.

3. The method of claim 1 wherein the surface map is spherically shaped, and wherein the spherically shaped surface map is partitioned by the mosaic of non-rectilinear cells.

4. The method of claim 1 wherein the mosaic of non-rectilinear shaped cells is shaped into a mosaic of Voronoi cells wherein each Voronoi cell is bounded by a neighboring Voronoi cell.

5. The method of claim 1 wherein the geographic feature represents a street.

6. The method of claim 1, wherein in the index, a subset of the mosaic associated with one stored row identifier associated, in the geographic look-up table, with a geographic identifier for a geographic feature located in a plurality of non-rectilinear shaped cells, indicates a plurality of non-rectilinear shaped cells including the geographic feature.

7. The method of claim 1, further comprising:
identifying a bounding region including the search region, wherein the determined non-rectilinear shaped cells intersect the bounding region including the search region.

8. The method of claim 7, wherein the bounding region comprises a circle or bound box.

9. The method of claim 1, wherein each index entry is comprised of a tuple, wherein a first part of the tuple indicates the non-rectilinear shaped cell and a second part of the tuple comprises the row identifier of the geographical feature.

10. A data processing system for managing geographic identifiers stored in a database, the geographic identifiers each identifying a respective geographic feature displayed on a surface map space partitioned by a mosaic of non-rectilinear shaped cells, the method comprising:

a central processing unit;

a computer usable memory including code executed by the central processing unit to perform operations, the operations comprising:

accessing a geographic look-up table in the computer usable memory associating a unique row identifier with each geographical feature;

for each row in the geographic look-up table, performing:

determining at least one non-rectilinear shaped cell that intersects the geographical feature associated with the row identifier in the row by determining at least one non-rectilinear shaped cell that intersects a bound box of the geographical feature;

for each of the determined at least one non-rectilinear shaped cell, generating an entry in an index in the computer usable memory identifying the row identifier of the geographical feature and the determined non-rectilinear shaped cell intersecting the geographical feature, wherein the index is a non-unique B-tree index, wherein the index associates the row identifiers of the geographical features with cell identifiers of non-rectilinear shaped cells that intersect the bound box including the geographical feature, and wherein an index key of the index comprises the identifier of the non-rectilinear shaped cell and a data value of the index comprises the row identifier of the geographical feature; and wherein the index associates the row identifiers of the geographical features with cell identifiers of non-rectilinear shaped cells that include the geographical feature, wherein there are multiple entries in the index for one row identifier intersecting multiple non-rectilinear shaped cells, wherein the multiple entries indicate the non-rectilinear shaped cells intersecting the geographical feature identified by the row identifier, and wherein the geographic look-up table and the index are stored in the database;

receiving a search region;

determining the non-rectilinear shaped cells that intersect the search region;

searching the index to determine the row identifiers associated with the cell identifiers of the determined non-rectilinear shaped cells included in the search region; and producing the determined row identifiers identifying the geographical features included in the search region.

11. The data processing system of claim 10 wherein the operations further comprise:
populating the geographic look-up table; and
populating the index.

12. The data processing system of claim 10 wherein the surface map is spherically shaped, and wherein the spherically shaped surface map is partitioned by the mosaic of non-rectilinear cells.

13. The data processing system of claim 10 wherein the mosaic of non-rectilinear shaped cells is shaped into a mosaic of Voronoi cells wherein each Voronoi cell is bounded by a neighboring Voronoi cell.

14. The data processing system of claim 10 wherein the geographic feature represents a street.

15. The data processing system of claim 10, wherein in the index, a subset of the mosaic associated with one stored row identifier associated, in the geographic look-up table, with a geographic identifier for a geographic feature located in a plurality of non-rectilinear shaped cells, indicates a plurality of non-rectilinear shaped cells including the geographic feature.

16. The data processing system of claim 10, further comprising:
identifying a bounding region including the search region, wherein the determined non-rectilinear shaped cells intersect the bounding region including the search region.

17. The data processing system of claim 16, wherein the bounding region comprises a circle or bound box.

18. The data processing system of claim 10, wherein each index entry is comprised of a tuple, wherein a first part of the tuple indicates the non-rectilinear shaped cell and a second part of the tuple comprises the row identifier of the geographical feature.

19. An article of manufacture having a computer usable memory embodying one or more computer usable instructions executable by a data processing system, the computer usable instructions for directing the data processing system to manage geographic identifiers stored in a database, the geographic identifiers each identifying a respective geographic feature displayed on a surface map space partitioned by a mosaic of non-rectilinear shaped cells, wherein the executed computer usable instructions perform operations, the operations comprising:
accessing a geographic look-up table associating a unique row identifier with each geographical feature;
for each row in the geographic look-up table, performing:
determining at least one non-rectilinear shaped cell that intersects the geographical feature associated with the row identifier in the row by determining at least one non-rectilinear shaped cell that intersects a bound box of the geographical feature;
for each of the determined at least one non-rectilinear shaped cell, generating an entry in an index identifying the row identifier of the geographical feature and the determined non-rectilinear shaped cell intersecting the geographical feature, wherein the index is a non-unique B-tree index, wherein the index associates the row identifiers of the geographical features with cell identifiers of non-rectilinear shaped cells that intersect the bound box including the geographical feature, and wherein an index key of the index comprises the identifier of the non-rectilinear shaped cell and a data value of the index comprises the row identifier of the geographical feature; and
wherein the index associates the row identifiers of the geographical features with cell identifiers of non-rectilinear shaped cells that include the geographical feature, wherein there are multiple entries in the index for one row identifier intersecting multiple non-rectilinear shaped cells, wherein the multiple entries indicate the non-rectilinear shaped cells intersecting the geographical feature identified by the row identifier, and wherein the geographic look-up table and the index are stored in the database;
receiving a search region;
determining the non-rectilinear shaped cells that intersect the search region;
searching the index to determine the row identifiers associated with the cell identifiers of the determined non-rectilinear shaped cells included in the search region; and
producing the determined row identifiers identifying the geographical features included in the search region.

20. The article of manufacture of claim 19 wherein the operations farther comprise:
populating the geographic look-up table; and
populating the index.

21. The article of manufacture of claim 19 wherein the surface map is spherically shaped, and wherein the spherically shaped surface map is partitioned by the mosaic of non-rectilinear cells.

22. The article of manufacture of claim 19 wherein the mosaic of non-rectilinear shaped cells is shaped into a mosaic of Voronoi cells wherein each Voronoi cell is bounded by a neighboring Voronoi cell.

23. The article of manufacture of claim 19 wherein the geographic feature represents a street.

24. The article of manufacture of claim 19 wherein in the index, a subset of the mosaic associated with one stored row identifier associated, in the geographic look-up table, with a geographic identifier for a geographic feature located in a plurality of non-rectilinear shaped cells, indicates a plurality of non-rectilinear shaped cells including the geographic feature.

25. The article of manufacture of claim 19 further comprising:
identifying a bounding region including the search region, wherein the determined non-rectilinear shaped cells intersect the bounding region including the search region.

26. The article of manufacture of claim 25 wherein the bounding region comprises a circle or bound box.

27. The article of manufacture of claim 19 wherein each index entry is comprised of a tuple, wherein a first part of the tuple indicates the non-rectilinear shaped cell and a second part of the tuple comprises the row identifier of the geographical feature.

* * * * *